US010795161B2

(12) United States Patent
Takashima et al.

(10) Patent No.: US 10,795,161 B2
(45) Date of Patent: Oct. 6, 2020

(54) PSEUDO PHASE CONJUGATE IMAGE TRANSFER DEVICE

(71) Applicant: THE ARIZONA BOARD OF REGENTS ON BEHALF OF THE UNIVERSITY OF ARIZONA, Tucson, AZ (US)

(72) Inventors: Yuzuru Takashima, Tucson, AZ (US); Alex J. Erstad, Tucson, AZ (US)

(73) Assignee: The Arizona Board of Regents on behalf of the University of Arizona, Tucson, AZ (US)

(*) Notice: Subject to any disclaimer, the term of this patent is extended or adjusted under 35 U.S.C. 154(b) by 233 days.

(21) Appl. No.: 15/743,590

(22) PCT Filed: Jul. 8, 2016

(86) PCT No.: PCT/US2016/041599
§ 371 (c)(1),
(2) Date: Jan. 10, 2018

(87) PCT Pub. No.: WO2017/011333
PCT Pub. Date: Jan. 19, 2017

(65) Prior Publication Data
US 2018/0196267 A1 Jul. 12, 2018

Related U.S. Application Data
(60) Provisional application No. 62/191,160, filed on Jul. 10, 2015.

(51) Int. Cl.
*G02B 27/01* (2006.01)
*G02B 5/30* (2006.01)
(Continued)

(52) U.S. Cl.
CPC .......... *G02B 27/0172* (2013.01); *G02B 5/124* (2013.01); *G02B 5/30* (2013.01);
(Continued)

(58) Field of Classification Search
CPC .... G02B 5/3066; G02B 9/34; G02B 27/0101; G02B 27/0172; G02B 27/286; F21V 13/08; F21V 13/10
See application file for complete search history.

(56) References Cited

U.S. PATENT DOCUMENTS 4,768,846 A   9/1988  Connors et al.
5,038,359 A   8/1991  Pepper et al.
(Continued)

OTHER PUBLICATIONS

International Search Report and Written Opinion for related International Application No. PCT/US2016/041599, dated Sep. 14, 2016, 9 pages.

*Primary Examiner* — Robert E. Tallman
(74) *Attorney, Agent, or Firm* — Klarquist Sparkman, LLP

(57) ABSTRACT

Methods, apparatus, and systems for the design and use of image guides with a retro-reflector and beam splitter are disclosed. In one example, an apparatus includes: a first image guide situated to propagate a ray bundle so that a first portion exits the image guide output at a first portion angle and a second portion exits the output at a second portion angle opposite the first portion angle, a retro-reflector situated to reflect the respective ray bundle portions along their respective propagation paths incident onto the retro-reflector; a beam splitter situated to receive the reflected ray bundle portions from the retro-reflector, and a second image guide situated to receive the first and second ray bundle portions reflected from the beam splitter plane. In some examples, the retro-reflector is a micro retro-reflector array.

(Continued)

In some examples, the retro-reflector is a pseudo-phase conjugate or phase conjugate mirror.

20 Claims, 15 Drawing Sheets

(51) Int. Cl.
| | |
|---|---|
| *G02B 6/00* | (2006.01) |
| *G02B 9/34* | (2006.01) |
| *G02B 27/28* | (2006.01) |
| *G02B 5/124* | (2006.01) |
| *G02B 5/32* | (2006.01) |
| *F21V 8/00* | (2006.01) |
| *G02B 27/14* | (2006.01) |

(52) U.S. Cl.
CPC ............ *G02B 5/3025* (2013.01); *G02B 5/32* (2013.01); *G02B 6/00* (2013.01); *G02B 6/003* (2013.01); *G02B 6/0055* (2013.01); *G02B 9/34* (2013.01); *G02B 27/017* (2013.01); *G02B 27/14* (2013.01); *G02B 27/28* (2013.01); *G02B 2027/0118* (2013.01); *G02B 2027/0123* (2013.01); *G02B 2027/0125* (2013.01); *G02B 2027/0174* (2013.01); *G02B 2027/0178* (2013.01)

(56) References Cited

U.S. PATENT DOCUMENTS

| | | | |
|---|---|---|---|
| 5,426,521 | A | 6/1995 | Chen et al. |
| 5,606,458 | A | 2/1997 | Fergason |
| 5,621,572 | A | 4/1997 | Fergason |
| 5,706,137 | A | 1/1998 | Kelly |
| 6,206,525 | B1* | 3/2001 | Rowland .......... B29D 11/00605 359/529 |
| 6,338,559 | B1 | 1/2002 | Williams et al. |
| 6,963,454 | B1 | 11/2005 | Martins et al. |
| 6,999,239 | B1 | 2/2006 | Martins et al. |
| 2008/0198459 | A1* | 8/2008 | Fergason ................ G02B 5/12 359/529 |
| 2009/0161109 | A1* | 6/2009 | Wolf ..................... B60S 1/0822 356/445 |
| 2011/0037951 | A1 | 2/2011 | Hua et al. |
| 2015/0153575 | A1* | 6/2015 | Komatsu ........... G02B 27/0172 345/8 |
| 2015/0286056 | A1* | 10/2015 | Takashima ............. G02C 11/10 359/633 |
| 2015/0378165 | A1* | 12/2015 | Zheng ................. G02B 27/281 359/633 |

\* cited by examiner

FIG. 3A
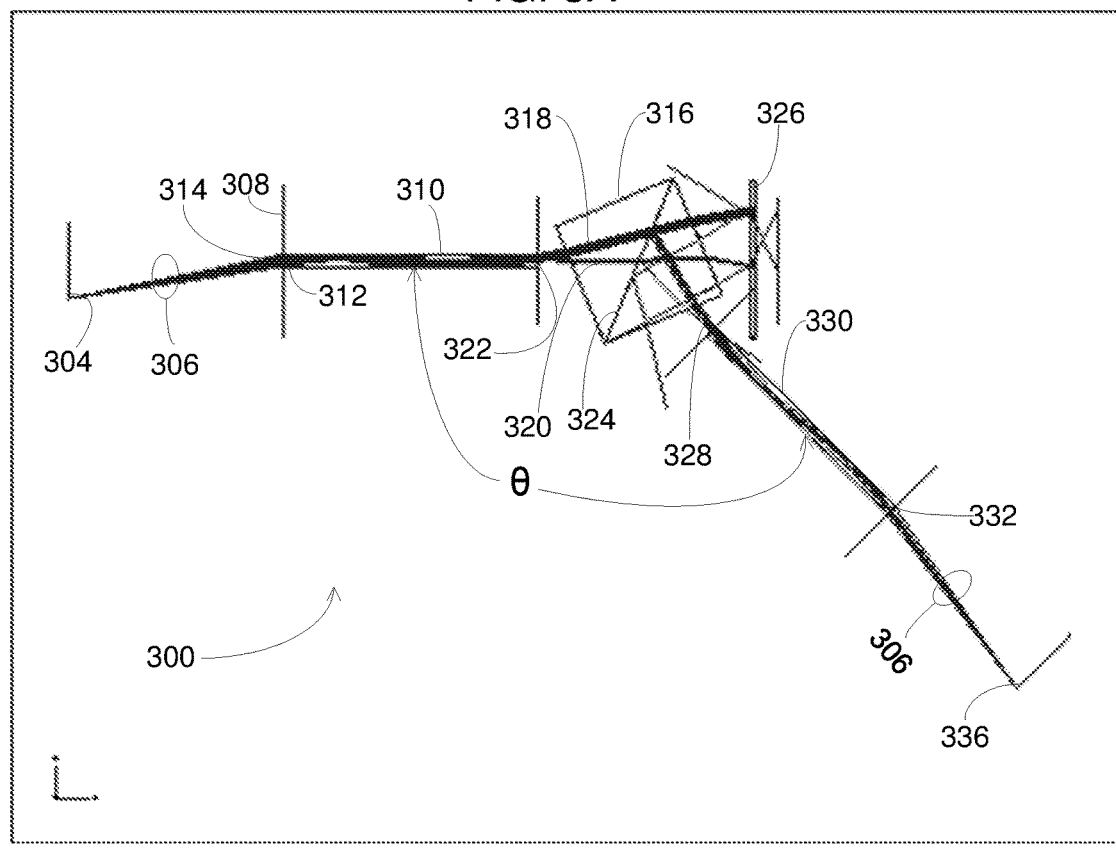
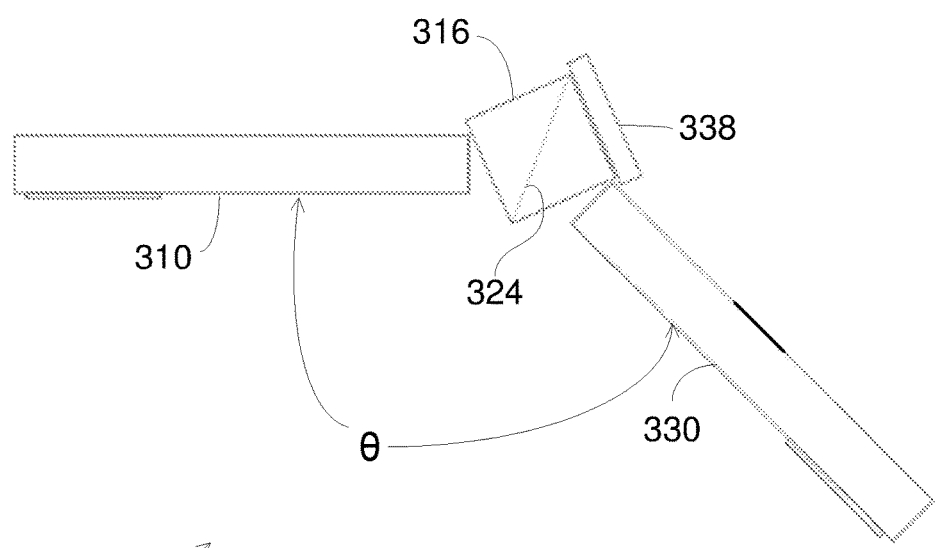
FIG. 3B

PSEUDO PHASE CONJUGATE IMAGE TRANSFER DEVICE

CROSS REFERENCE TO RELATED APPLICATIONS

This is the U.S. National Stage of International Application No. PCT/US2016/041599, filed Jul. 8, 2016, which was published in English under PCT Article 21(2), which in turn claims the benefit of U.S. Provisional Patent Application 62/191,160, entitled "PSEUDO PHASE CONJUGATE IMAGE TRANSFER DEVICE," filed Jul. 10, 2015. The provisional application is incorporated herein by reference in its entirety.

TECHNICAL FIELD

The disclosure pertains to image transfer devices and head-up displays (HUD).

BACKGROUND

Head-up Display (HUD) design presents challenging problems to enhancing device performance in areas including resolution, field of view, brightness, and size and location of eye-boxes of the display image, while keeping the size, weight, and power sufficiently low. Employing complex optical systems and adopting advanced optical engineering and fabrication techniques, such as free-form optics results in increased size, weight, and power, which is often less desirable or unacceptable in certain applications, such as a modern battlefield environment. For many or most HUD or Head-Mounted Display (HMD) systems that employ incoherent imaging, problems are often associated with a continued reliance on conventional display device-to-eye imaging frameworks using bulk optical components.

SUMMARY

According to one aspect of the disclosed technology, the use of a Pseudo-Phase conjugate for image transfer via ultra-small form factor medium can be employed for Head-up Displays (P2HD). A phase conjugate (PC) apparatus can be employed to reproduce characteristics of an electromagnetic wave prior to being distorted by an initial component of an optical system. One use of the disclosed technology is to compensate chromatic dispersion of a fiber optical channel with a chirped fiber Bragg grating. In non-linear optics the technique is used to restore images distorted by propagation via turbulence. As such examples indicate, the PC technique is able to recover from distorted optical information the original undistorted optical information. The distorted information through a non-ideal optical channel (or optical medium) is recovered by sending the wave back through the distorting optical system in the reverse direction followed by a second propagation through the non-ideal optical channel. In some examples of the disclosed technology, two substantially identical optical mediums are used in a P2HD optical system. Therefore, the P2HD optical system enables image transfer by an ultra-thin form factor and transparent devices, which can even be buried inside or integrated into prescription glasses and sunglasses.

In one example of the disclosed technology, a system includes a first image guide having an input, an output, and an optical axis, the first image guide being situated to receive a ray bundle through the input and to propagate the ray bundle so that a first portion of the ray bundle exits the output at a first portion angle with respect to the first image guide optical axis and a second portion of the ray bundle exits the output at a second portion angle opposite the first portion angle with respect to the optical axis, a retro-reflector situated to receive the first and second ray bundle portions and to reflect the respective portions along their respective propagation paths incident onto the retro-reflector, a beam splitter having a beam splitter plane, the beam splitter being situated to receive the reflected first and second ray bundle portions from the retro-reflector and to reflect the first and second ray bundle portions at a beam splitter plane, and a second image guide having an input, output, and optical axis, and situated to receive the first and second ray bundle portions reflected from the beam splitter plane.

In some system examples, the retro-reflector can be a micro retro-reflector array, a pseudo-phase conjugate or phase conjugate mirror, a micro corner cube array, a roof mirror array, or a cat's eye array. In some examples, the beam splitter is a polarized beam splitter. In some examples, a holographic optical element is situated to couple the ray bundle out of the second image guide perpendicular to the second image guide optical axis. In further examples, a holographic optical element is situated to couple the ray bundle into the first image guide perpendicular to the first image guide optical axis. In some examples of the system, the first image guide, the second image guide, or the first image guide and the second image guide comprise an optical fiber. In some examples, the system is incorporated into a HUD or HMD apparatus.

BRIEF DESCRIPTION OF THE DRAWINGS

FIGS. 3A and 3B are schematics and ray traces of additional examples of image transfer devices.

DETAILED DESCRIPTION

Disclosed below are representative embodiments of methods, apparatus, and systems for the design and use of image guides with a retro-reflector and beam splitter. The disclosed methods, apparatus, and systems should not be construed as being limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other things and methods. Additionally, the description sometimes uses terms like "produce," "generate," "propagate," "receive," "emit," and "provide" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Moreover, unless the context dictates otherwise, the term "coupled" means mechanically, electrically, or electromagnetically connected or linked and includes both direct connections or direct links and indirect connections or indirect links through one or more intermediate elements not affecting the intended operation of the described system.

Additionally, certain terms may be used such as "up," "down," "upper," "lower," and the like. These terms are used, where applicable, to provide some clarity of description when dealing with relative relationships. But, these terms are not intended to imply absolute relationships, positions, and/or orientations.

Figure 1:
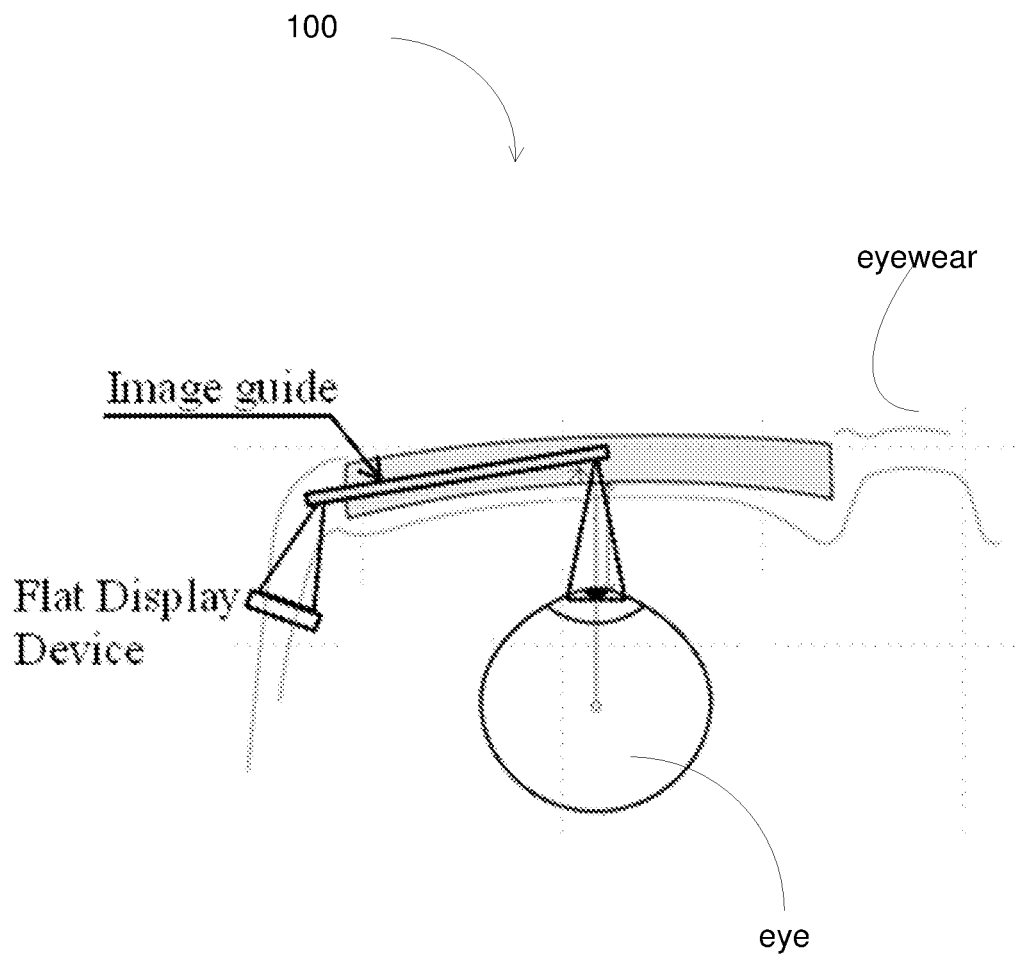
FIG. 1 is an example of eyewear with an image transfer device.

FIG. 1 illustrates an example of eyewear having an image transfer device 100 that couples a flat display device to an image guide that projects an image into the pupil of an eye.

In certain HMDs, the optical medium through which image information propagates is typically limited to free-space or image guides employing total internal reflection. The medium is typically an isotropic one (free-space, no-gradient index) and wave vector components ($k_x$, $k_y$), or equivalently angle of rays, is conserved at least in magnitude. For these reasons, rectangular image guiding media are generally used in such HMDs.

In some examples employing the PC techniques disclosed herein introduced into a HMD, practical restrictions on the shape and index of refraction of the image transmission medium can be avoided. Monochromatic and polychromatic lens aberrations can be corrected. Therefore, in some examples of the disclosed technology it possible to avoid using high-end, expensive optics. Moreover, in certain examples illustrated by fiber communication, certain disclosed PC techniques can compensate chromatic dispersion. Accordingly, chromatic and other image aberrations can be compensated. In certain examples, propagation of rays twice through an identical medium can take advantage of the PC technique.

In certain examples, the PC-based approaches disclosed herein can be used to solve pupil-matching problems in HMDs. Thus, a large eye box extent in lateral directions or large projection optics can desirably be avoided, along with the associated extent of the optics system, which increases accordingly. For example, given an eye box size extent d in mm, and half field of view of T in degrees, and distance from the eye box to the first surface of the lens L in mm, the diameter of the lens is approximated by:

$$2\{(d/2) + L \times \tan(T)\}. \qquad \text{Eqn. (1)}$$

As Equation (1) indicates, in conventional approaches, the size of the first surface of the projection lens is larger than that of the eye box size. In a pseudo phase conjugate approach, the size of the first surface of the projection lens is not limited by Eqn. (1). Instead, in some examples the location of the exit pupil of the projection lens can be matched to the location of the eye box. Thus, projection optics can be as small as the eye box and, as a result, reduction of the size of the projection optics is feasible. In some examples, the size of projection optics, such as an objective lens diameter, can remain fixed as field of view of image transfer is increased.

Thus, the PC technique can have significant advantages. However, one issue in certain examples of the disclosed technology is implementing PC functionality, without using fiber Bragg-gratings or non-linear optics in a small profile HMD optical engine. In certain examples of the disclosed technology, a pseudo-phase conjugate is implemented in a ray-optics domain by using a micro retro-reflector array.

Figure 2:
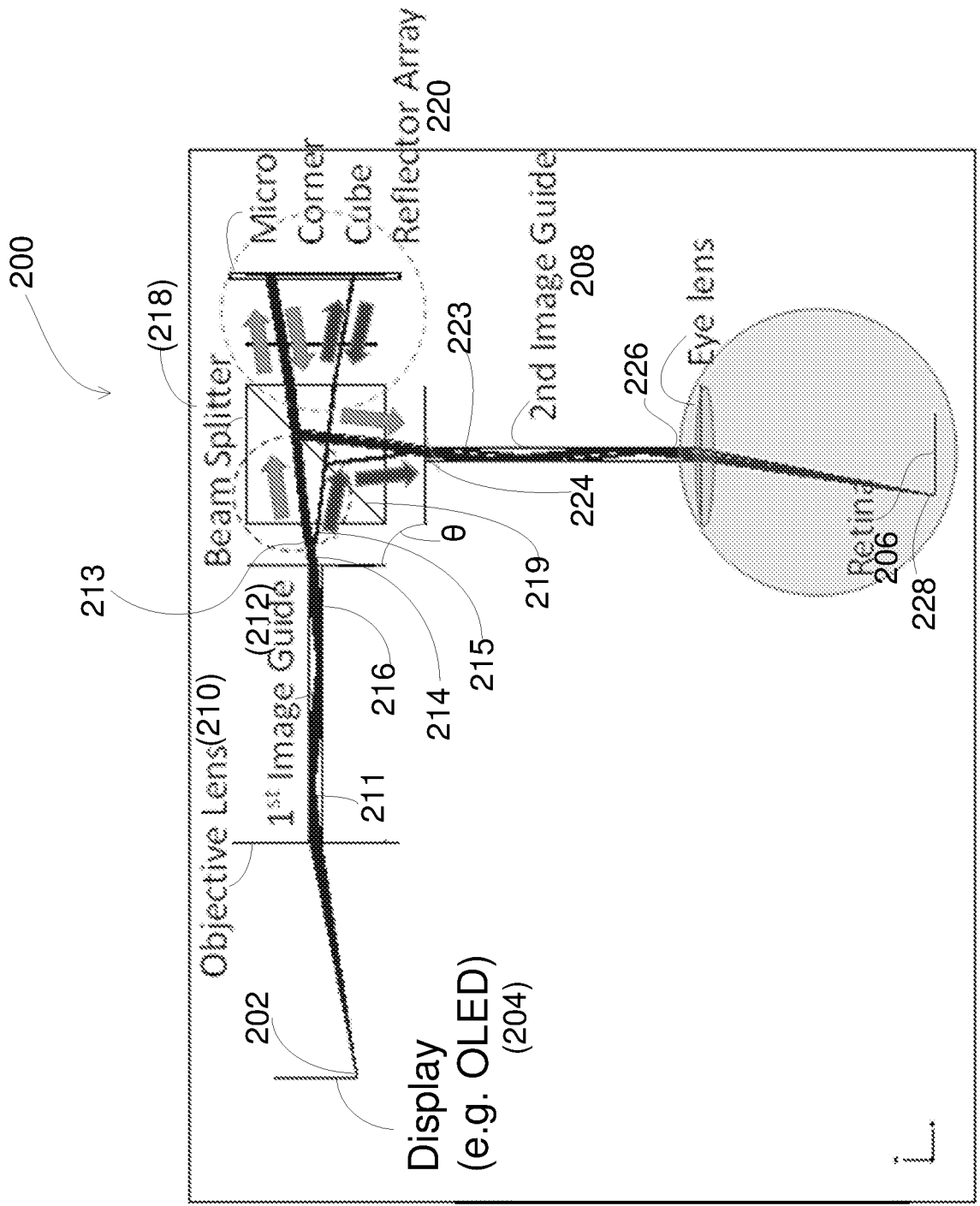
FIG. 2 is a schematic and ray trace of an example of an image transfer device.

FIG. 2 illustrates an example 200 of a phase-conjugate technique as applied to a Head-up Display (PcHUD). As depicted in FIG. 2, an image 202 is transferred from a display device 204, such as an OLED, LCD, DMD, or 2D laser scanner, to the retina 206 through an edge of a second image guide 208, such as a glass slab. The image 202 displayed on the display device 204 is quasi-collimated by an objective lens 210. The quasi-collimated beam propagates inside a first image guide 212, such as a glass slab, as a ray bundle 211 and is reflected by total internal reflection (TIR). At an exit end 214 of the first image guide 212, a first ray bundle portion 213 of the ray bundle 211 has an exit angle with a magnitude that is conserved with respect to an incident angle of the ray bundle 211 at the input side of the first image guide 212. However, the sign of the exit angle depends on the number of times TIR occurs for the first ray bundle portion 213. Also, since the ray bundle 211 has a finite extent perpendicular to the propagation path of the ray bundle 211, when the ray bundle 211 reflects at a side 216 in proximity to the exit end 214 and propagates past the exit end 214, the ray bundle 211 typically splits so as to form the first ray bundle portion 213 and to form a second ray bundle portion 215 having an exit angle equal in magnitude to the exit angle of the first ray bundle portion 213 but opposite in sign. Due to the splitting into the first and second ray bundle portions 213, 215 and the corresponding uncertainty of the ray angles, a duplicated image artifact can be created.

In certain examples of the disclosed technology, pseudo phase conjugate optics are used in the HMD (example of which can be known herein as P2HD). A beam splitter 218, a micro corner cube array (MCCA) 220, the second image guide 208, and an eye lens 222 are placed in a symmetrical manner in relation to the first image guide 212 and objective lens 210 with respect to a beam-splitting plane 219 of the beam splitter 218. The symmetry solves both of the angular uncertainty problem and the ray splitting problem. In FIG. 2 the split first and second ray bundle portions 213, 215 are reflected by the micro corner cube array 220 back towards, but in the opposite direction of, the respective incoming ray bundle portions 213, 215. The reflected rays are redirected by the beam splitter towards the second image guide 208.

As shown in FIG. 2, inside the beam splitter 218, the two ray bundle portions 213, 215 exist because the ray bundle 211 inside the first image guide 212 is received by both the exit end 214 and the side 216. The two ray bundles portions 213, 215 are combined to form a combined ray bundle 223 at an input end 224 of the second image guide 208, and propagate in an opposite manner to the ray trajectory inside the first image guide 212. At an exit end 226 of the second image guide 208, the combined ray bundle 223 exits as a single ray bundle. The single ray bundle is focused by the eye lens 222 onto the retina 206. As a result, the image 202 on the display 204, such as a point image, is perceived by the observer as an image 228. Point-to-point imaging has been described and depicted in FIG. 2, however since any two-dimensional image can be decomposed into an ensemble of point images, the pseudo phase conjugate image formation also can be applied to the generation of two-dimensional images.

The example 200 in FIG. 2 shows a geometry where the image propagation axes before and after the beam splitter 218 are at an angle θ of approximately 90 degrees. However, other examples of P2HD apparatus are not limited to a 90 degree geometry. For example, in certain cases, any angle $0<\theta<180$ is feasible. FIGS. 3A and 3B depict point-to-point optical ray trace operation of examples 300, 302 of P2HD devices that have geometries other than a 90 degree geometry. The example 300 includes an image source 304 that directs a ray bundle 306 that diverges and is received by a collimating lens 308 situated adjacent to a first image guide 310. The first image guide 310 receives the ray bundle 306 as a collimated or quasi-collimated beam at an image guide input 312 that typically includes an input surface 314 or plane that is perpendicular to a longitudinal axis of the first image guide 310. In typical examples, the collimating lens 308 is adjacently spaced apart from and in close proximity to the image guide input 312. In further examples, the collimating lens 308 can extend from the first image guide input 312 so that an exit surface of the collimating lens 308 is in contact with or forms a part or the whole of the input surface 314. A beam splitter 316 is situated to receive the ray bundle 306 as first and second ray bundle portions 318, 320 exiting an output 322 of the first image guide 310. The ray bundle portions 318, 320 exit the output 322 at respective equal angles with opposite sign with respect to the longitudinal axis of the first image guide 310. The ray bundle portions 318, 320 propagate through a beam-splitting plane 324 and out the beam splitter 316 so as to be received by a retro-reflector 326, such as a roof mirror array. The retro-reflector 326 reflects the ray bundle portions 318, 320 back along their respective paths and the ray bundle portions 318, 320 are reflected at the beam-splitting plane 324 and directed so as to be received through an image guide input 328 of a second image guide 330 and to reform the ray bundle 306. The angle θ between the first and second image guides 310, 330 is 135 degrees or approximately 135 degrees, and in some examples the beam-splitting plane 316 is situated to bisect the angle θ so as to form a symmetrical relationship between the first and second image guides 310, 330 and the beam splitter 316. The ray bundle 306 propagates in the second image guide 330 and exits an output 332 to be received by a lens 334 (e.g., such as the eye of an observer) so as to form an image 336 corresponding to the image source 304. As long as the system example 300 substantially holds symmetry of the first and second image guides 310, 330 with respect to the beam-splitting plane 324 of the beam splitter 316, the image 336 can be formed based on the image source 304 without substantial image duplication. It will be appreciated that in some examples, the input surface 314 and corresponding output 332 are not perpendicular to the respective image guide longitudinal axes.

The example 302 depicted in FIG. 3B also includes first and second image guides 310, 330 and beam splitter 316. A retro-reflector 338 is situated adjacent to the beam splitter 316 and can be a two-dimensional cat eye reflector.

As FIGS. 2 and 3 show, representative examples of the disclosed technology include a symmetric feature with respect to the beam-splitting plane 324. Thus, in certain examples, three or more image guides, such as glass slabs, can be used in an arbitrary angle between two of them. For example, first and second image guides can have an angle of 135 degrees and the second and a third image guide can have an angle of 135 degrees. Therefore, the angle between first and the third image guides is 90 degrees. Multi-image guide configurations can provide a piecewise flexible image transfer device as the angles between adjacent image guides can be flexibly adjusted so that users of the device can properly position the device with respect to the eye of the user.

Though P2HD examples include symmetry features, associated image guides are not limited to rectangular glass slabs, but can instead have any arbitrary shape including having bends and folds and various cross-sections, provided the total internal reflection condition is satisfied and provided the image guides are identical to each other. The image guiding material can be also a bundle of image guides, as long as the symmetry among the image guides is substantially maintained. In some embodiments, the image guides can be hollow. In some examples, the objective lens or other projection optics can have focal lengths different from typical eye lens focal lengths. For example, an eye may have a focal length of about 17 mm, whereas a projection lens situated to couple an image beam into an image guide may have a focal length of 10 mm. It will be appreciated that other focal lengths and other image projection optics can be used.

Figure 4:
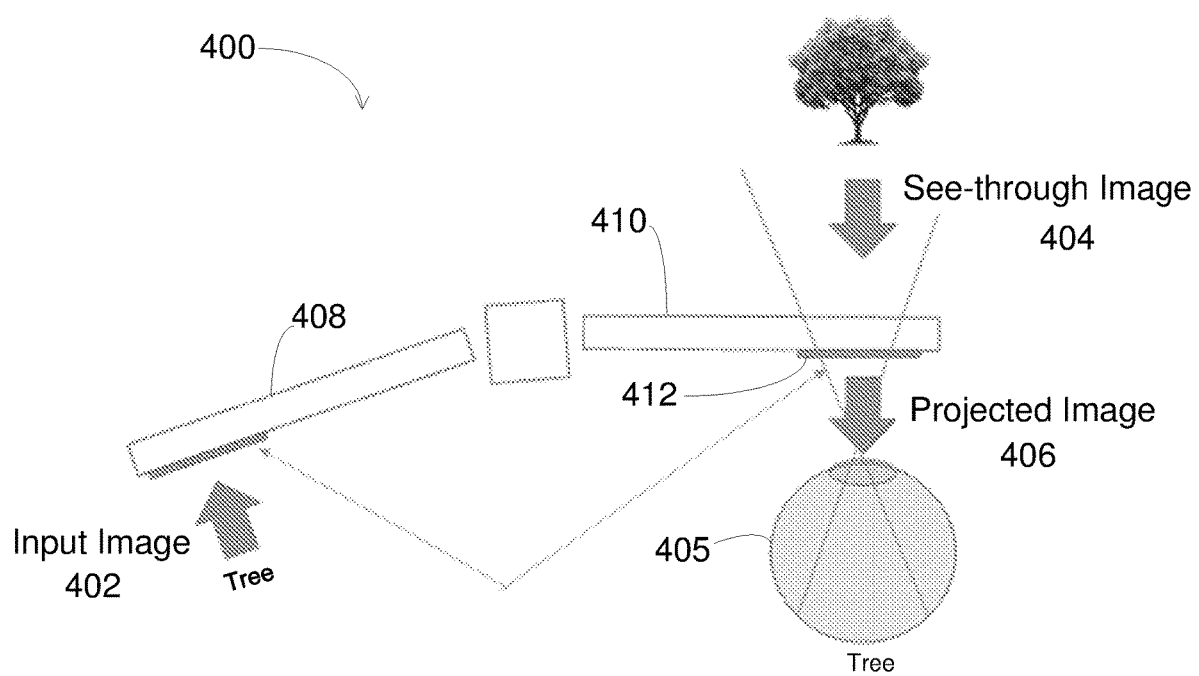
FIG. 4 is a schematic of another example of an image transfer device.

For practical HUD applications, such as with the representative embodiment of an image transfer device 400 depicted in FIG. 4, a guided image 402 is typically superimposed with a see-through image 404 of, for example, the environment external to the image transfer device 400. For example, as shown in FIG. 4, a user's eye 405 is situated adjacent to an output of the image transfer device 400 so as to see a transferred image 406 that includes a tree situated in the external environment. The transferred image 406 also includes the guided image 402 sent through a plurality of image guides 408, 410 of the image transfer device 400, which can include the text characters "Tree." The transferred image 406 is formed by superimposing the guided image 402 on the see-through image 404 with a holographic beam combiner 412, which is discussed further in additional examples below. In some examples, the guided image 402 and see-through image 404 are combined to form the transferred image 406 with an embedded beam-splitting device, such as a planar grating, beam splitter, beam splitter array, partially reflective mirror array, or mirror array.

Figure 5A:
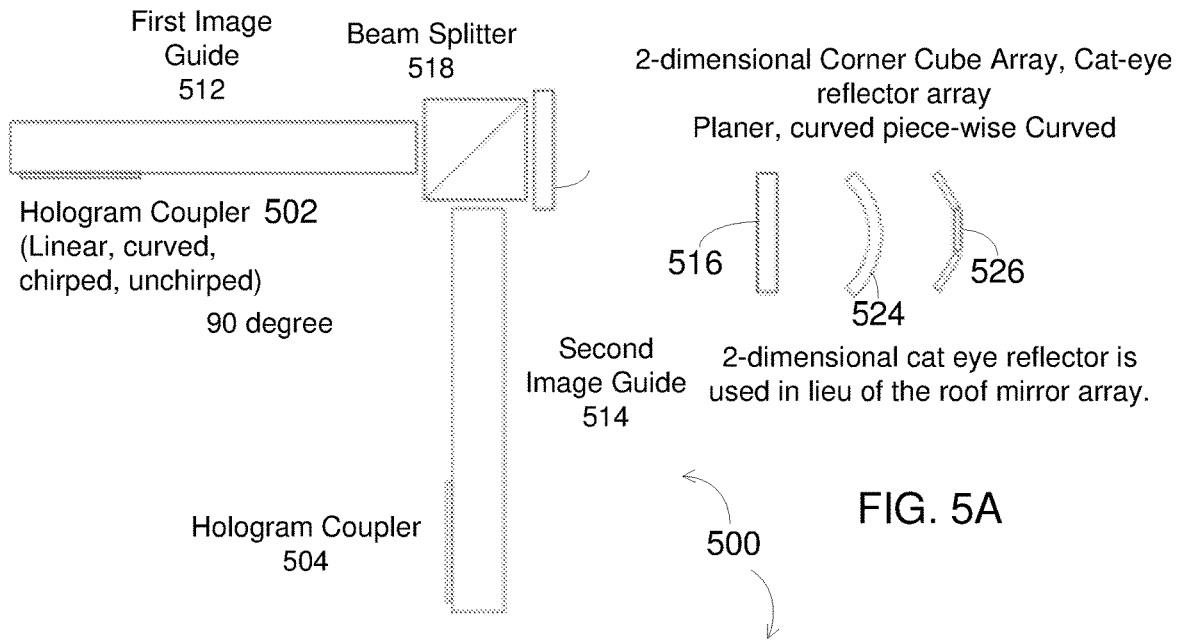
FIG. 5A is a plan view schematic of another example of an image transfer device.
Figure 5B:
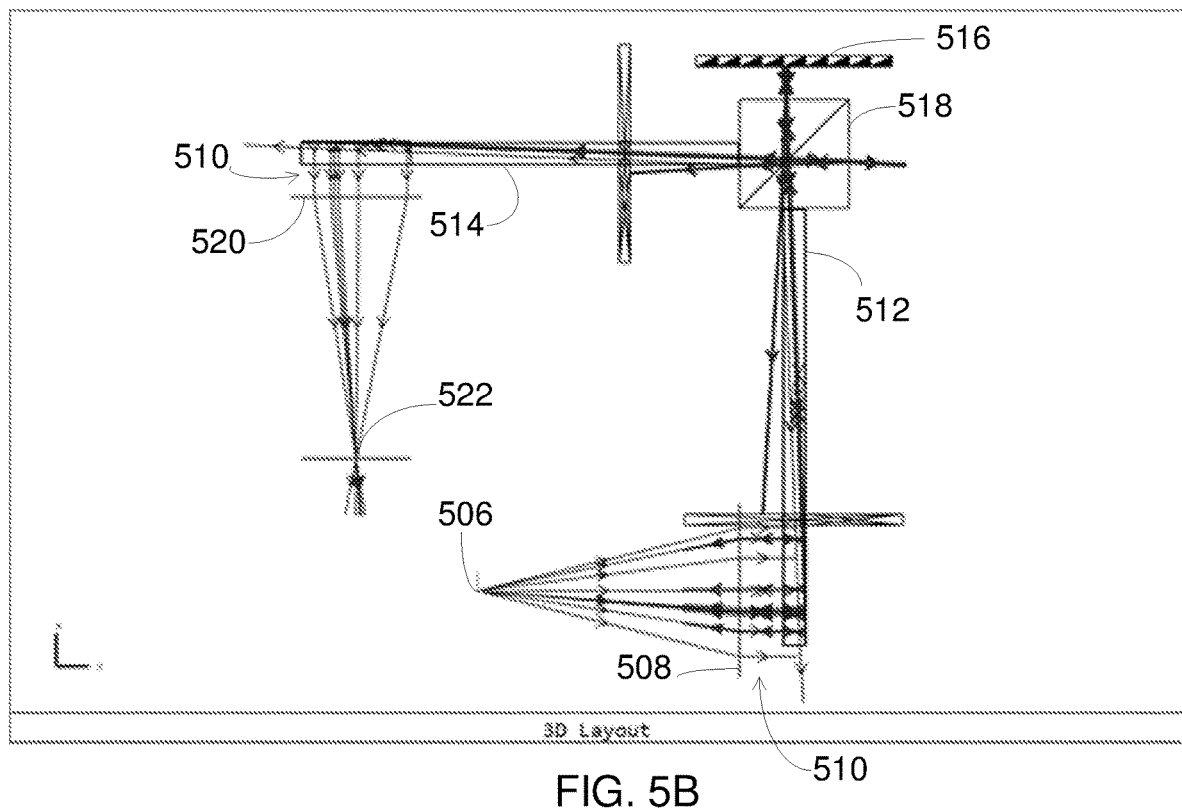
FIG. 5B is a ray trace of the example image transfer device shown in FIG. 5A.

FIG. 5A shows a schematic diagram of a representative embodiment of a P2HD device 500 that includes holographic beam combiners 502, 504. FIG. 5B shows a ray trace diagram of the P2HD device 500 with the holographic beam combiners 502, 504. A point image 506 is collimated by an objective lens 508 to form a collimated beam 510. The collimated beam 510 is coupled to a propagating mode inside a first image guide 512 by the holographic beam combiner 502, such as a holographic diffraction grating or other diffraction grating. Instead of using the objective lens 508 to form the collimated beam 510, the holographic beam combiner 502 can include a ray bending power so as to reduce the number of optical components and/or improve image quality. The rays of the collimated beam 510 propagate inside the first image guide 512 by total internal reflection (typically multiple internal reflections), and are coupled to a second image guide 514 by a linear retro-reflector 516, such as a micro corner cube array, and a beam splitter 518. The rays of the collimated beam 510 propagating inside the second image guide 514 are coupled to the outside of the second image guide 514 by the holographic beam combiner 504. The holographic beam combiner 504 on the second image guide 514 can be situated symmetrically with respect to the beam-splitting plane of the beam splitter 518 and the holographic beam combiner 502 of the first image guide 512. Thus, the collimated beam 510 is coupled into the first image guide 512 at an angle (e.g., perpendicular) with respect to the optical axis of the first image guide 512 and is coupled out of the second image guide 514 also at an angle (e.g., perpendicular) with respect to the optical axis of the second image guide 514 so as to be received and focused by an eye lens 520 of an observer. As a result, the point image 506 is formed as a point image 522 on the observer's retina. As described herein above, the pseudo phase conjugate image formation may be applied to two dimensional images as well as point-to-point images, including with see-through or pass-through images combined with the two dimensional formed images.

Figure 5C:
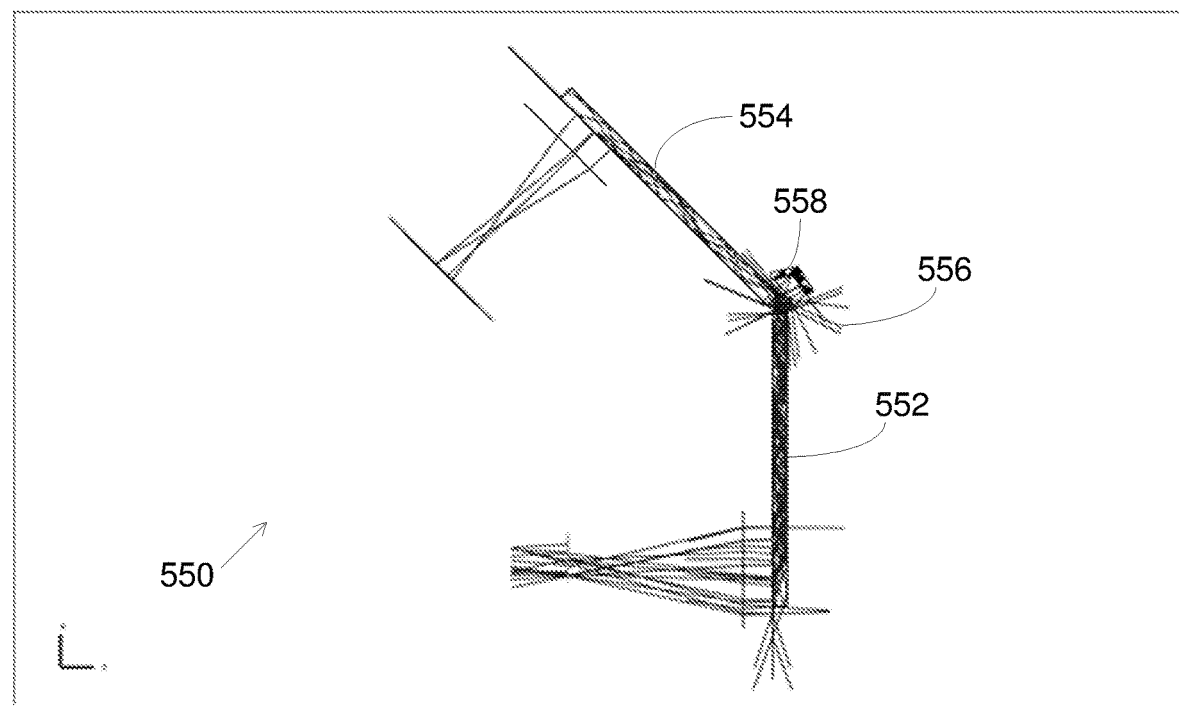
FIG. 5C is a ray trace of variations of the example image transfer device shown in FIGS. 5A and 5B.
Figure 5C:
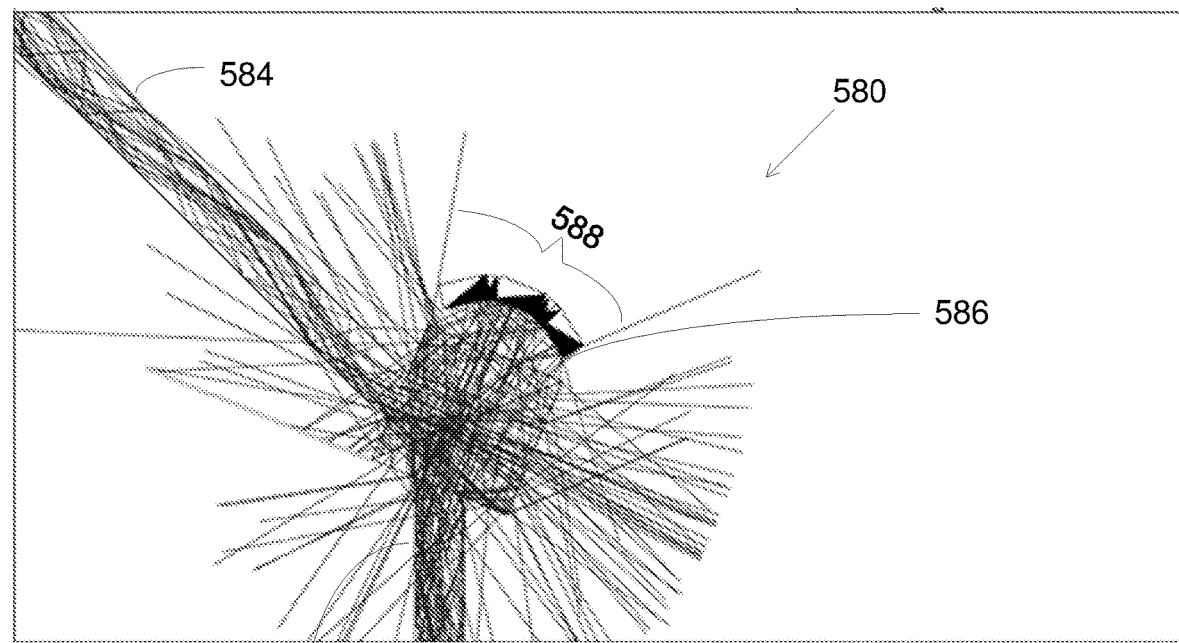

As illustrated in FIG. 5A and in the ray-trace diagrams of additional examples of image transfer devices 550, 580 shown in FIG. 5C, a curved retro-reflector 524 or a piece-wise curved retro reflector array 526 can be used in place of the linear retro-reflector 516, and the curved or piecewise curved retro-reflector arrays 524, 526 can be effective to increase a field of view associated with the image 522. The image transfer device 550 includes a first image guide 552 and a second image guide 554 situated symmetrically with respect to a beam splitter 556 at a non-orthogonal angle. A two-piece retro-reflector 558 is situated adjacent to the beam splitter 556. The image transfer device 580 also includes a first image guide 582 and a second image guide 584 situated symmetrically with respect to a beam splitter 586. A three-piece retro-reflector 588 is situated adjacent to the beam splitter 586 so as to receive and retro-reflect image forming beams back towards the beam splitter 586. In some examples, single-piece retro-reflectors can provide a ±10 degree field of view, a two-piece retro-reflector, can provide a ±20 degree field of view, and a three-piece retro-reflector can provide a ±30 degree field of view. It will be appreciated that various other fields of view can be provided and the amount of scaling based on the piece-wise quantity increase of the retro-reflector can vary.

Diffractive beam combiners, including holographic beam combiners and gratings, can induce image artifacts, such as color splitting, since the diffractive components can be chromatically dispersive. Chromatic color splitting by diffractive components can be automatically compensated in preferred examples herein. As a result, LED-based display devices and other multi-color image sources become viable options for use with the P2HD. In typical examples, a band pass filter can be used to narrow a spectrum width associated with LED based devices used with or coupled to a holographic beam combiner. However for certain P2HD examples, confining the spectrum width of the imaging source to a finite range or value is less of an issue for image formation, because chromatic dispersion induced by a first holographic element coupled to a first image guide can be automatically compensated by a second holographic beam combiner coupled to the second image guide where the phase profiles (or shape of groove lines of holographic beam combiner for the case of surface relief grating) of the second holographic beam combiner and the first holographic element are identical, matching, or otherwise complementary. Therefore, to increase optical efficiency of the image transfer device while maintaining see-through or image combining functionality, the cross-sectional shape of the surface relief grating examples, or thickness of volume holographic grating examples, can be selected independent from correction for chromatic dispersion. Some holographic beam combiner examples can include grooves with surface profiles that are rectangular, sawtooth shape, or step-wise approximated sawtooth shape. In some examples, groove or grating periods or pitches for holographic beam combiners are typically on the order of sub-micrometers, and groove or grating heights are typically on the order of micrometers. In some examples, grating period corresponds with the field of view associated with the image transfer device. The grating height can be individually selected in relation to the grating pitch. The aspect ratio of grating or groove is typically defined by dividing the height by the pitch, and in certain examples the aspect ratio is larger than one (1.0). In some examples, the grating height can be determined by, for example, RCWA (Rigorous Coupled Wave Analysis).

In the P2HD examples herein, not only can the image be transferred, but the location of the exit pupil can be transferred as well. For example, in FIG. 5B, the exit pupil of the objective lens 508 is the objective lens 508 itself. The exit pupil is imaged, too, at the location of the eye pupil, which corresponds to the eye lens 520. Therefore, the size of the objective lens 508 can be as large as the eye box size, for example, 10 mm for a display system situated in close proximity to the eye. In a conventional display system, the last surface, the optical surface closest to the eye, of a projection lens, such as an objective lens, corresponds to Eqn. (1). In examples of the disclosed technology herein, the extent of the first surface of the objective lens 508 can be significantly smaller than objective or projection lenses in conventional systems, since the exit pupil of the objective lens 508 is imaged at the location of the eye box for the observer. This results from the phase conjugate nature of the image transfer devices herein.

Figure 6:
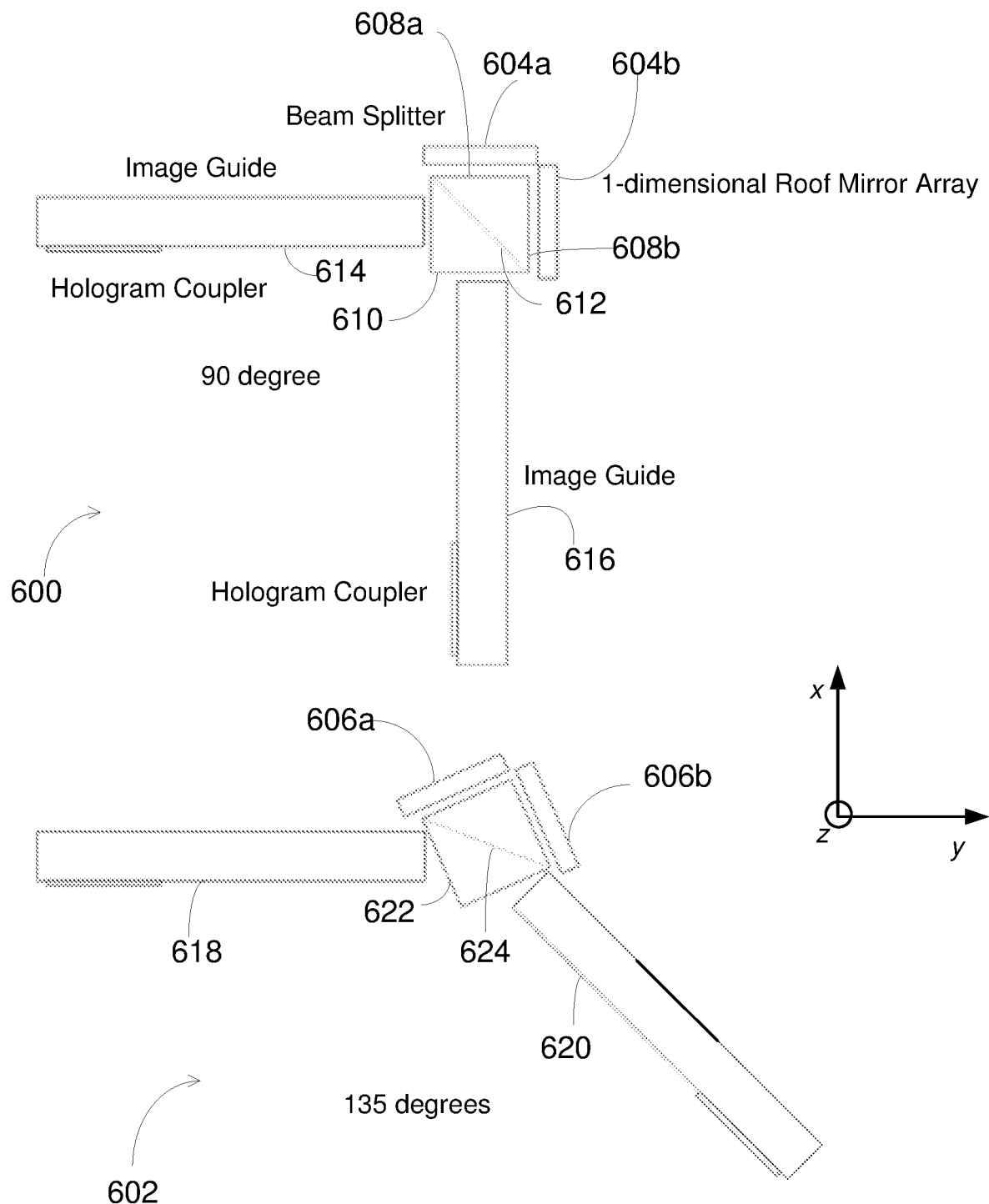
FIG. 6 is a schematic of another example of an image transfer device.

As depicted in FIG. 6, a pair of image transfer device examples 600, 602 each includes two, one-dimensional corner cube mirror arrays 604a, 604b, 606a, 606b that are respectively arranged in a 90 degree geometry and a non-90 degree geometry. For the illustrated two-linear-corner-cube-arrays configuration, to image a 2-dimensional object, instead of using a one- and two-dimensional retro-reflector mirror array, the two linear retro-reflector arrays 604a, 604b (such as roof-mirror array, and roof prism array) are positioned adjacent to surfaces 608a, 608b respectively of a beam splitter 610 so that the surfaces 608a, 608b are orthogonal to each other. A beam-splitting plane 612 extends so as to be symmetrically situated between a first image guide 614 and a second image guide 616. In some examples, the first linear retro-reflector array 604a is placed so that its ridge line lies in the x-y plane (shown by the axis of FIG. 6) and the ridge line of the second linear retro-reflector array 604b lies in a plane perpendicular to the x-y plane. In some examples, the ridge lines of the first linear retro-reflector array 604a can lie in the x-direction and the ridge lines of the second linear retro-reflector array 604b can lie in the z-direction. The image transfer device example 602 includes a first image guide 618 and a second image guide 620 symmetrically situated at a non-90 degree angle and with respect to a beam splitter 622 having a beam-splitting plane 624.

Figure 7:
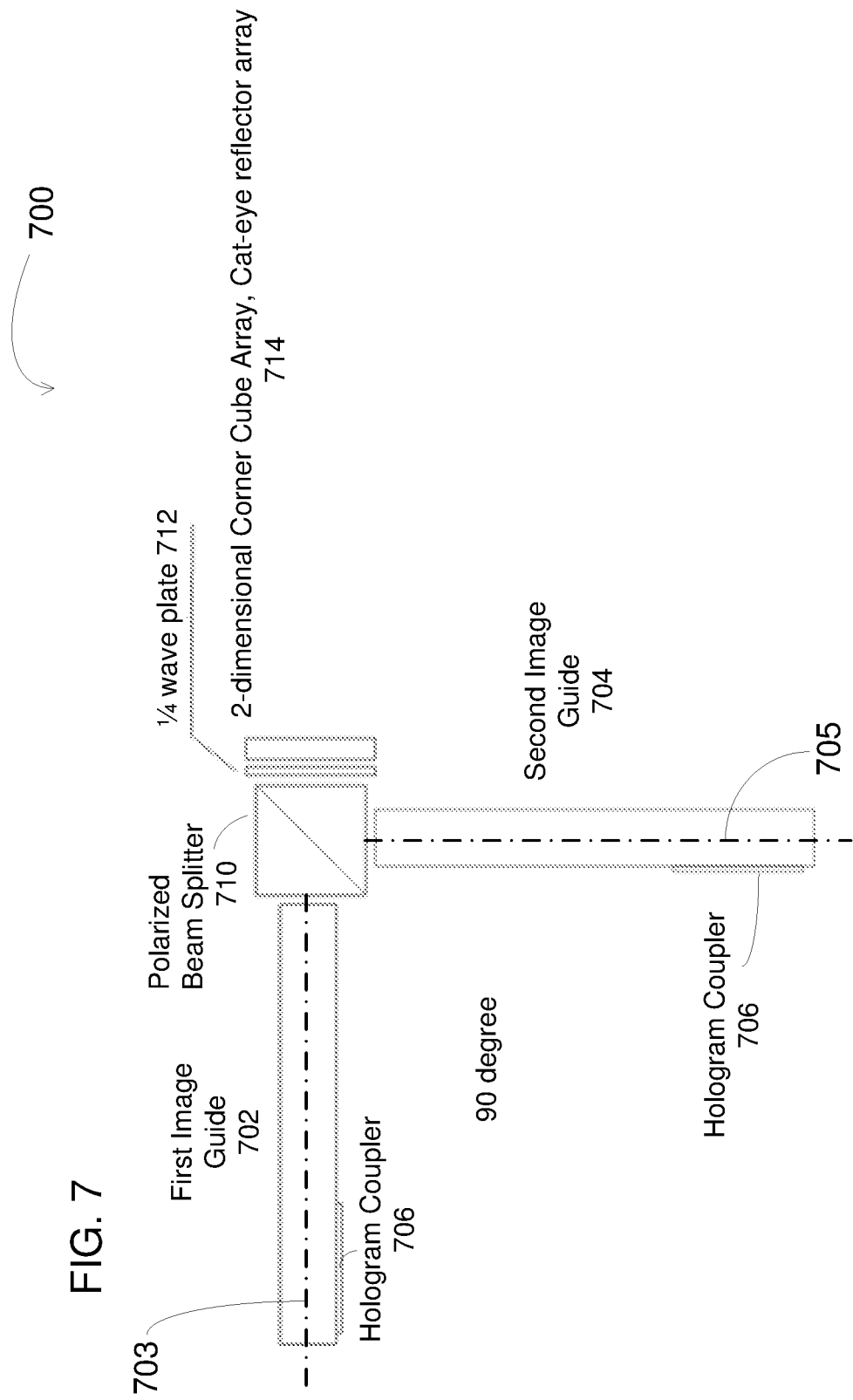
FIG. 7 is a schematic of another example of an image transfer device.

FIG. 7 shows a representative embodiment of a P2HD system 700 that employs polarization optical components. In some of such examples, increased optical throughput can be achieved. The P2HD system 700 includes a first image guide 702 having a longitudinal optical axis 703 and a second image guide 704 having a longitudinal optical axis 705 arranged at 90 degrees or about 90 degrees to the longitudinal axis 703. A holograph coupler 706 is coupled to or forms part of an input end of the first image guide 702 so as to receive an image beam. A hologram coupler 708 is coupled or forms part of an output end of the second image guide 704 so as to emit the image beam after multiple reflections to an imaging lens, such as an eye of an observer. A polarizing beam splitter (PBS) 710 is symmetrically situated between the first image guide 702 and the second image guide 704 so as to receive the image beam as image beam portions and direct the image beam portions into an input end of the second image guide 704.

With a non-polarized beam splitter having a 50:50 beam-splitting ratio, the ratio of the power of light emitted from the exit side of the first image guide to the power captured by the incident side of the second image guide is 25%. To increase the ratio, a polarized beam splitter, such as the PBS 710, can be used in lieu of the non-polarized beam splitter. A quarter wave plate 712 is situated between the PBS 710 and a retro-reflector 714, such as a corner cube mirror array, which can be surface coated or back coated by metal such as gold, aluminum, or silver. In some examples, the retro-reflector 714, the quarter wave plate 712, and the PBS 710 can be closely situated (e.g., attached to each other) as well as spaced apart from each other.

In representative embodiments, the image beam has a polarization state with an electric vector that is close to perpendicular to the plane of incidence of the image beam upon total internal reflection inside one or more of the image guides so that the polarization state is preserved upon total internal reflections inside the image guide. For example, the PBS 710 can be situated so that the incident polarized light of the image beam received from the first image guide 702 is transmitted through the PBS 710. The quarter wave plate 712 converts the linearly polarized light of the image beam to circularly polarized light. The circularly polarized light of the image beam is reflected by the retro-reflector 714 and the polarity of circularly polarized light is reversed. Upon the subsequent transmission of the image beam through the quarter wave plate 712, the direction of polarization of the image beam becomes rotated by 90 degrees. The PBS 710 then reflects the image beam having its polarization state rotated by 90 degrees. In this configuration, the ratio of the power of light emitted from the exit side of the first image guide 702 to the power captured by the incident side of the second image guide 704 can be close to 100% (e.g., greater than 98%, 95%, 90%, etc.).

Figure 8:
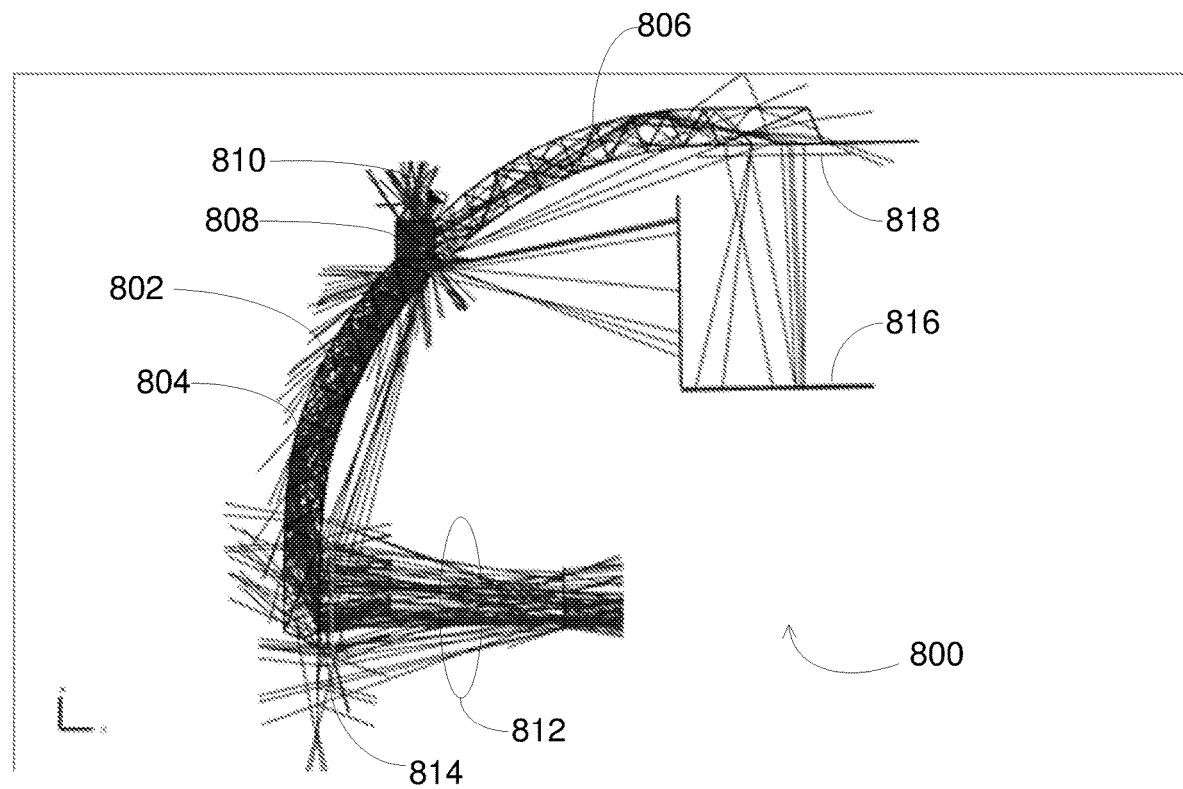
FIG. 8 is a ray trace of another example of an image transfer device.

In FIG. 8, an example P2HD system 800 that employs non-rectangular image guides is depicted. The system 800 includes a curved image guide 802 that includes a pair of image guide portions 804, 806 oppositely and symmetrically situated with respect to a middle beam splitter 808, such as a beam splitter cube.

The two image guide portions 804, 806 can be formed of identical glass slabs (BK7, 10×40 mm, t=2 mm). A one-dimensional or two-dimensional retro-reflector array 810 is situated to receive an image beam 812 from the middle beam splitter 808 so as to reflect the image beam 812 for subsequent coupling into the second image guide portion 806. The image guide portions 804, 806 are edge polished so that the image beam 812 propagates through by total internal reflection. In one example, a USAF test chat is collimated by a f=7 mm lens 814 to collimate the image beam 812, and the image beam 812, now collimated, is coupled to the first image guide portion 804 of the system 800 through an edge of the first image guide portion 804. The image beam 812 propagates through the optical components of the system 800 and is imaged onto a CMOS sensor 816 by a second f=7 mm lens 818. The CMOS sensor 816 and the second lens 818 work in a similar fashion as a human eye.

Figure 9:
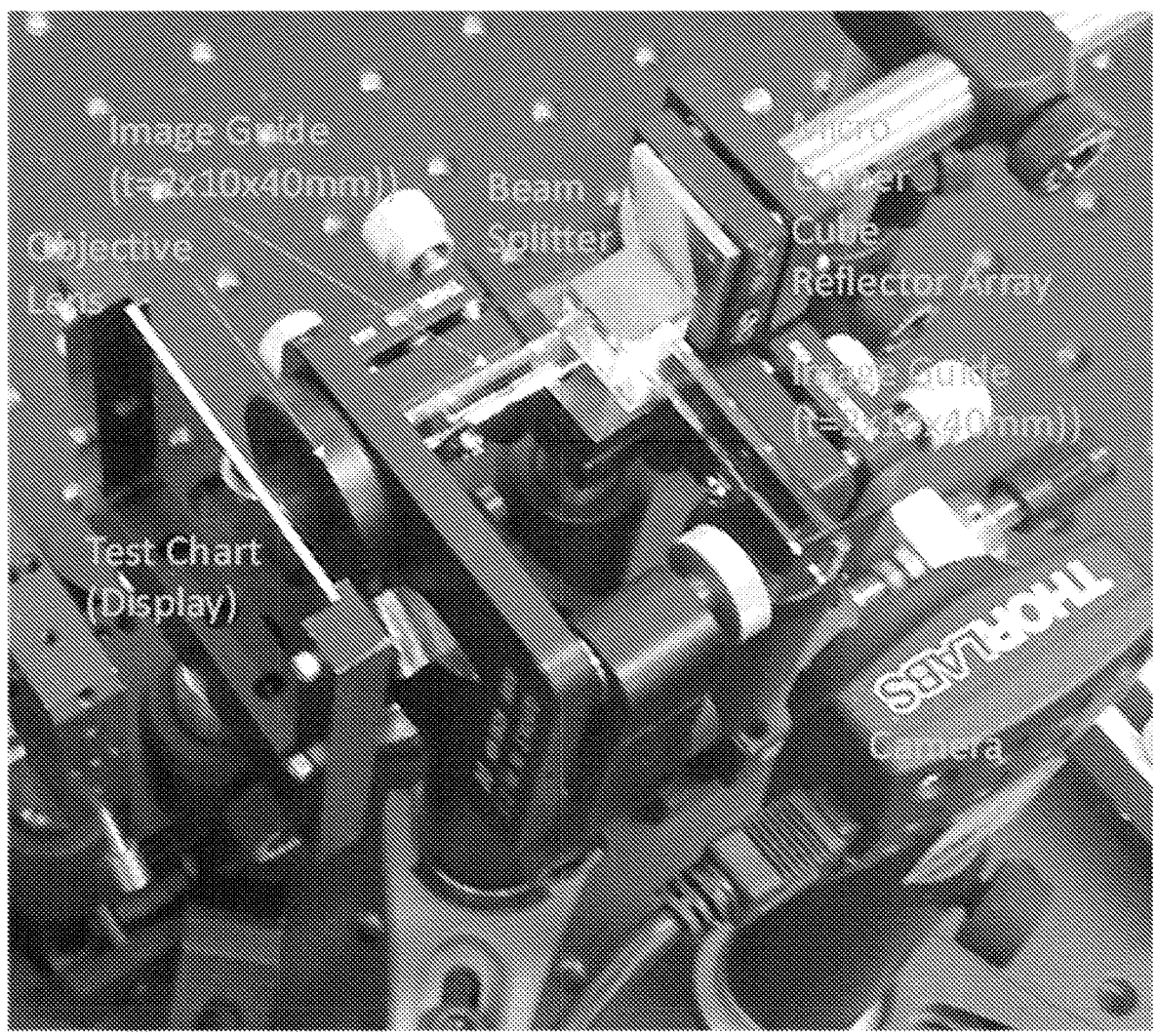
FIG. 9 is a picture of experimental setup of an example of an image transfer device.
Figure 10A:
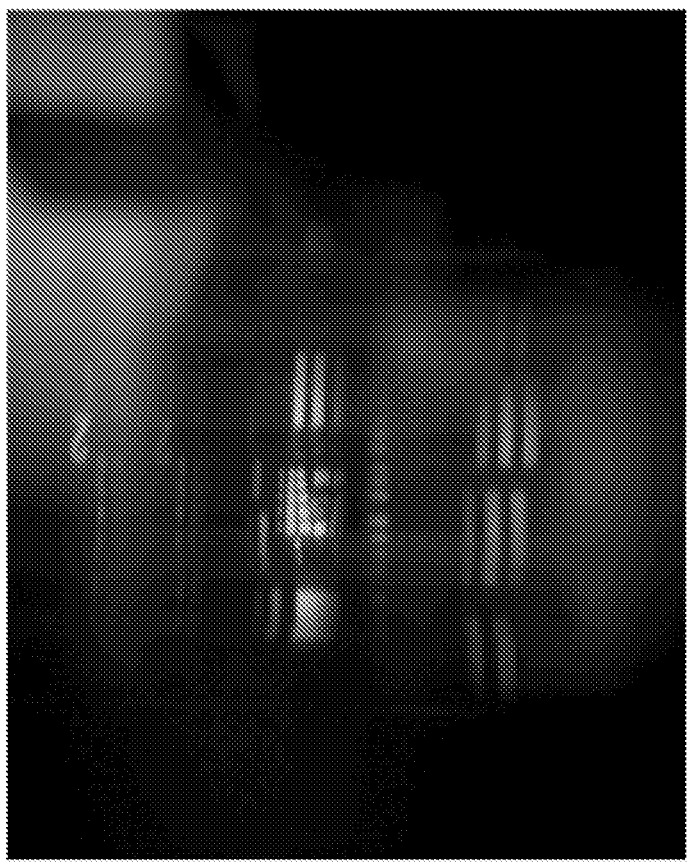
FIG. 10A is a picture of a poorly transferred image in the experimental setup shown in FIG. 9.
Figure 10B:
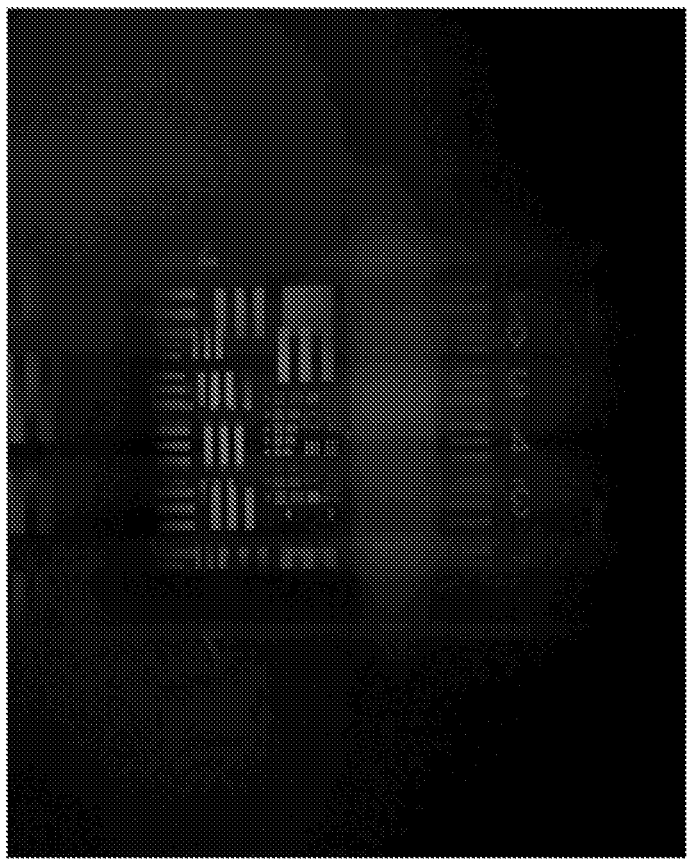
FIG. 10B is a picture of a successfully transferred image using the experimental setup shown in FIG. 9.

FIG. 9 depicts an experimental apparatus for undoing of the image splitting associated with a P2HD optical system according to the disclosed technology. In the depicted arrangement, a roof mirror reflector array is used in lieu of the corner cube array. Thus, the image of a test chart is restored in one dimension. FIG. 10A is a photograph that shows image formation without pseudo phase conjugate. The observed image is horizontally duplicated and flipped. FIG. 10B is a photograph that shows image formation with PC according to a representative embodiment of the disclosed technology. Due to the imperfection of roof mirror array, the image is blurred. However, there is no duplicated and flipped image, as is observed in FIG. 10A.

Figure 11:
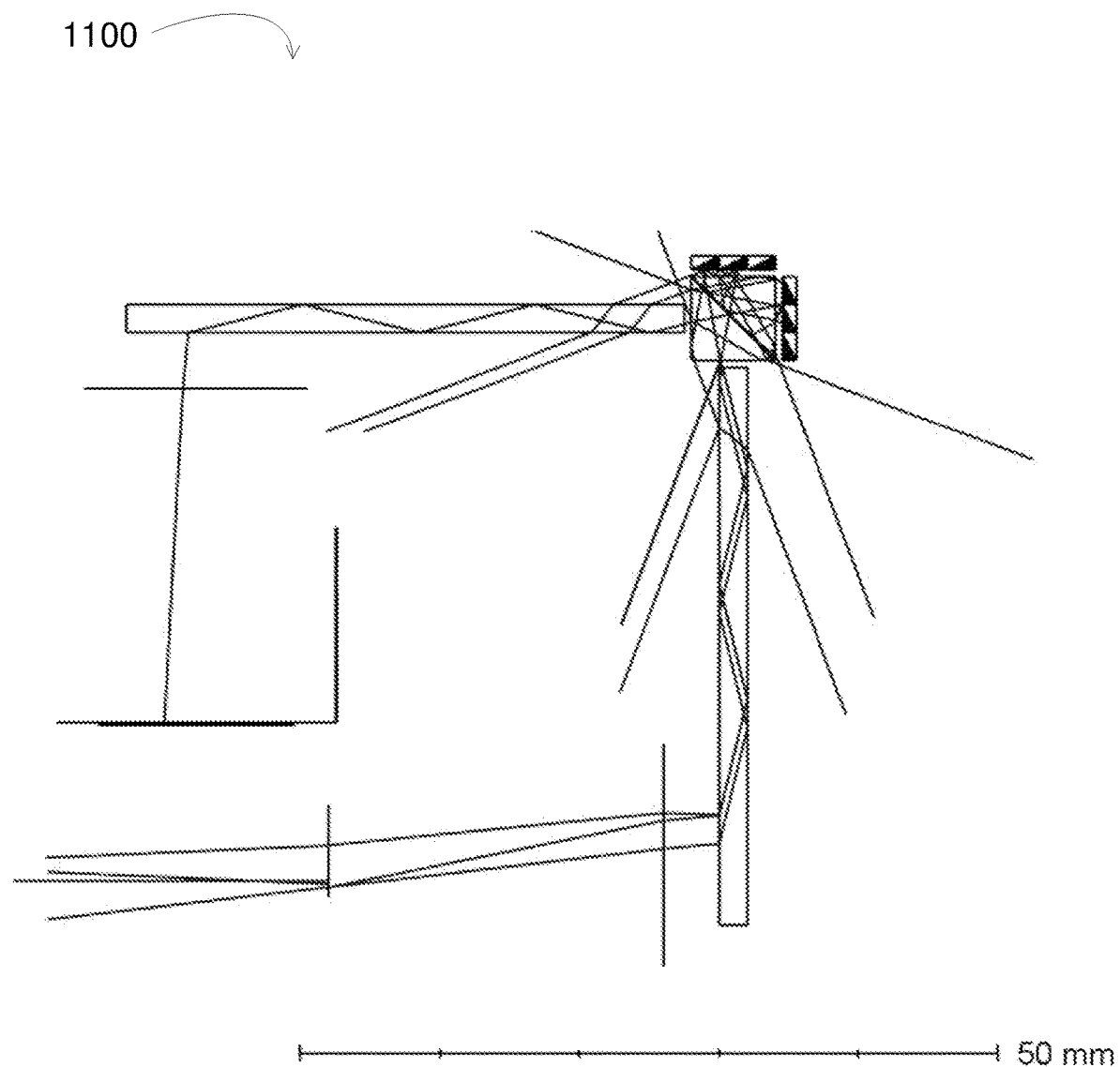
FIG. 11 is a ray trace simulation of an example image transfer device.
Figure 12:
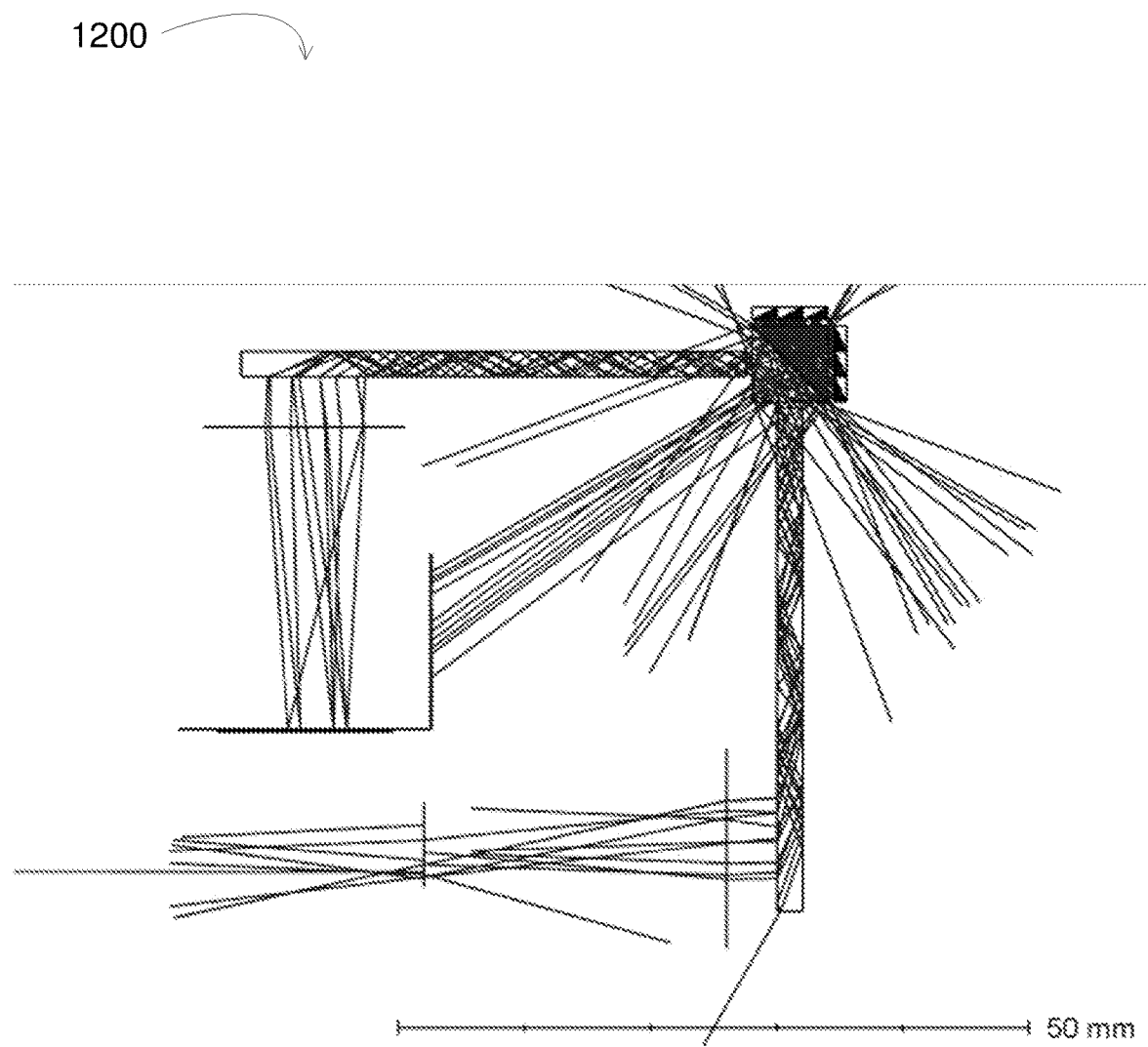
FIG. 12 is a ray trace simulation of an example image transfer device.

FIG. 11 depicts a ray trace simulation 1100 of the image transfer device example 600 discussed above regarding FIG. 6. FIG. 12 depicts another ray trace simulation 1200 of the image transfer device example 600 discussed above regarding FIG. 6, with an additional number of simulated rays.

Figure 13:
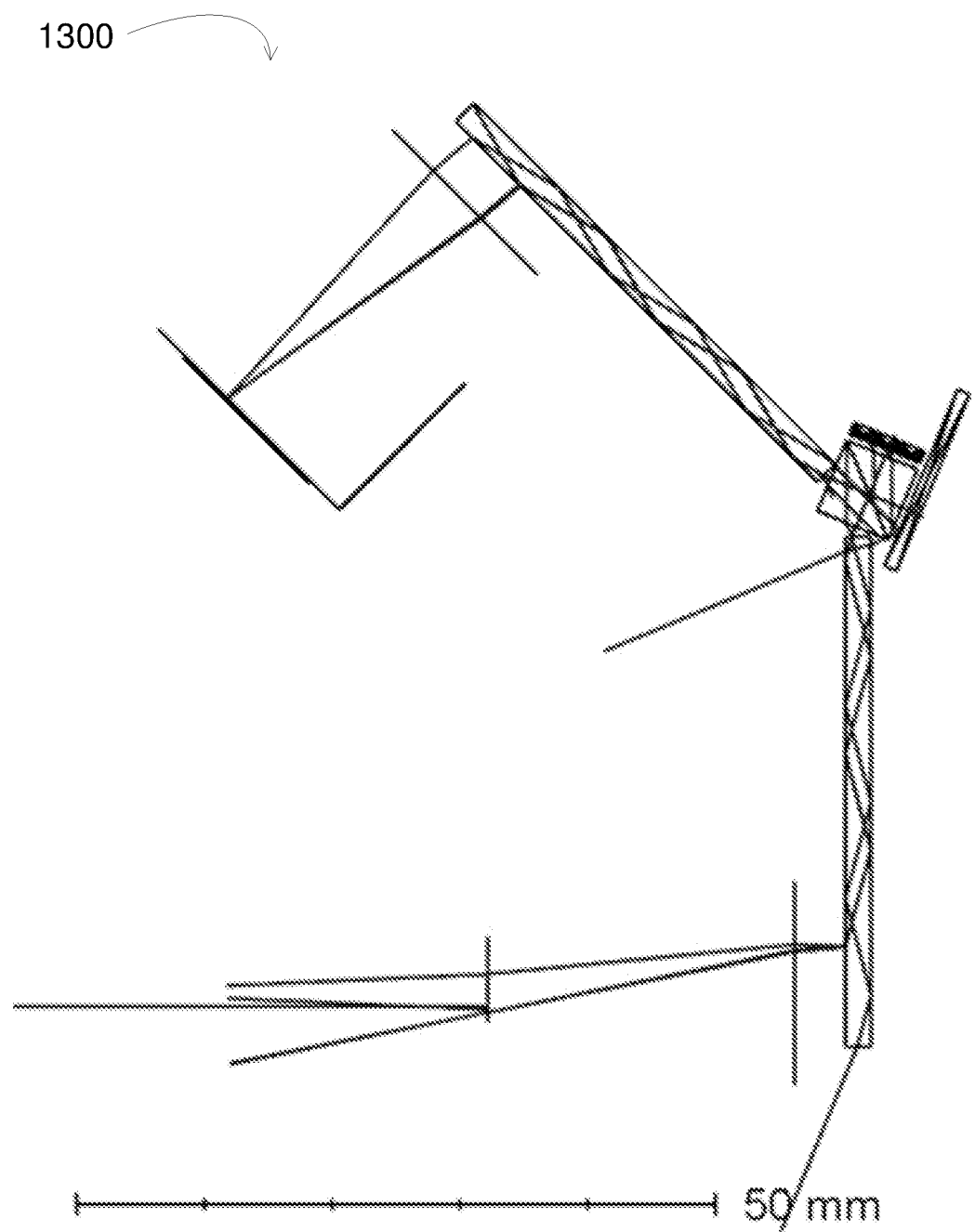
FIG. 13 is a ray trace simulation of an example image transfer device.
Figure 14:
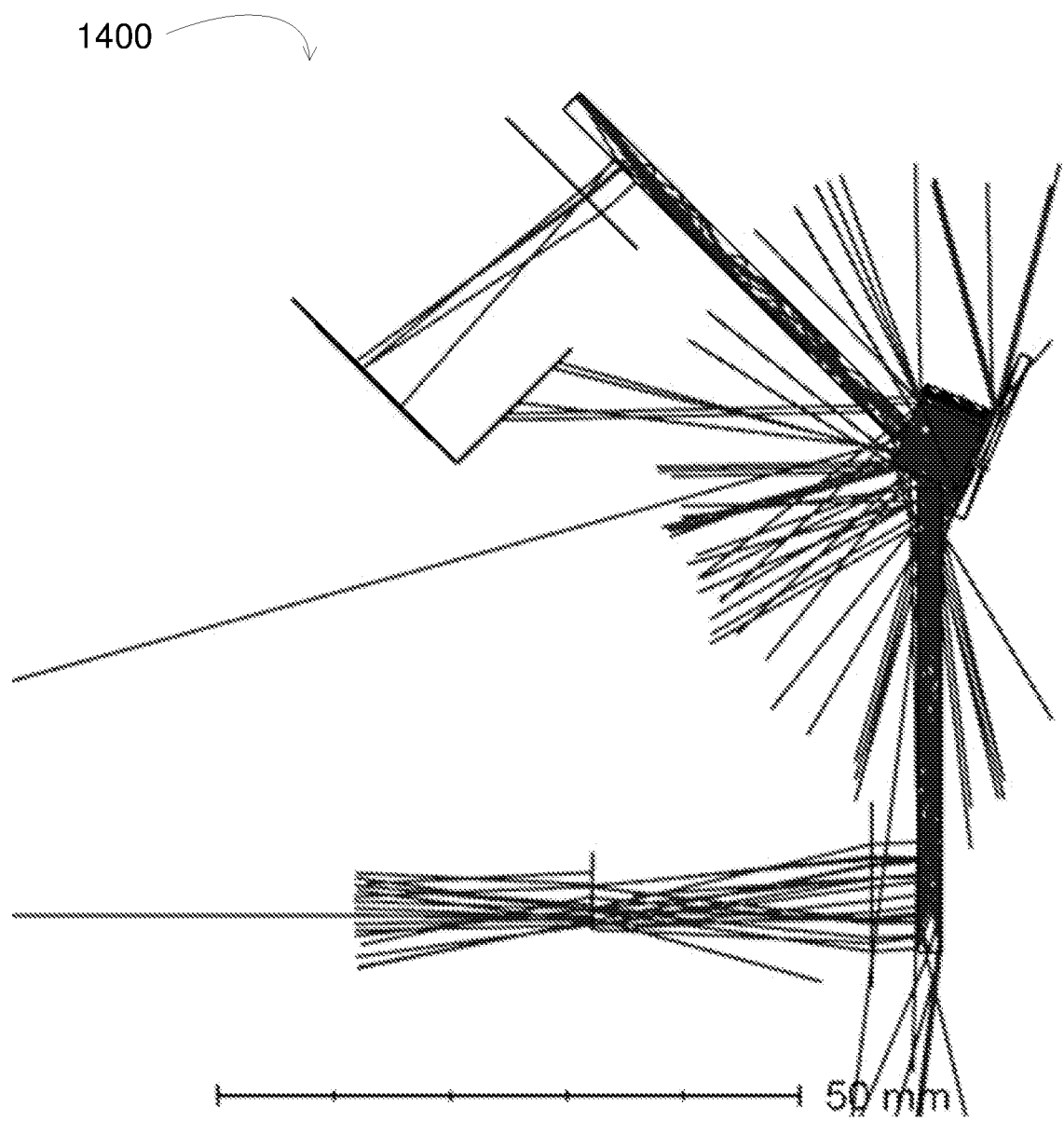
FIG. 14 is a ray trace simulation of an example image transfer device.

FIG. 13 depicts a ray trace simulation 1300 of the image transfer device example 602 discussed above regarding FIG. 6. FIG. 14 depicts another ray trace simulation 1400 of the image transfer device example 602 discussed above regarding FIG. 6, with an additional number of simulated rays.

In view of the many possible embodiments to which the principles of the disclosed technology may be applied, it should be recognized that the illustrated embodiments are only preferred examples and should not be taken as limiting the scope of the claims. Rather, the scope of the invention is defined by the following claims. We therefore claim as our invention all that comes within the scope of these claims.

We claim:
1. An apparatus, comprising:
 a first image guide having an input, an output, and an optical axis, the first image guide being situated to receive a ray bundle through the input and to propagate the ray bundle so that a first portion of the ray bundle exits the output at a first portion angle with respect to the first image guide optical axis and a second portion of the ray bundle exits the output at a second portion angle opposite the first portion angle with respect to the optical axis;

a retro-reflector situated to receive the first and second ray bundle portions and to reflect the respective portions along their respective propagation paths incident onto the retro-reflector;

a beam splitter having a beam splitter plane, the beam splitter being situated to receive the reflected first and second ray bundle portions from the retro-reflector and to reflect the first and second ray bundle portions at a beam splitter plane; and a second image guide having an input, output, and optical axis, and situated to receive the first and second ray bundle portions reflected from the beam splitter plane.

2. The apparatus of claim 1, wherein the retro-reflector is a pseudo-phase conjugate or phase conjugate mirror.

3. The apparatus of claim 1, wherein the optical axis of the first image guide is situated at a selected angle between 0 degrees and 180 degrees in relation to the optical axis of the second image guide, and the beam splitter plane is situated at about half the selected angle in relation to the optical axis of the first image guide and in relation to the optical axis of the second image guide.

4. The apparatus of claim 1, wherein the ray bundle received by the first image guide is collimated or quasi-collimated.

5. The apparatus of claim 1, further comprising a display source situated to emit the ray bundle to be received by the first image guide.

6. The apparatus of claim 1, further comprising a quarter wave plate situated between the beam splitter and the retro-reflector so as to rotate the polarization of the first and second ray bundle portions received from the first image guide by 90 degrees before the reflection at the beam splitter plane.

7. The apparatus of claim 1, further comprising:
one or more sets of an additional image guide having a respective input, output, and optical axis, an additional beam splitter, and an additional micro retro-reflector array, each set situated to receive the first and second ray bundle portions from a preceding image guide.

8. The apparatus of claim 1, wherein the first and second ray bundle portions form a recombined ray bundle through pseudo-phase conjugation.

9. The apparatus of claim 1, further comprising at least one of:
a first holographic optical element situated to couple the ray bundle into the first image guide at an angle with respect to the first image guide optical axis; or
a second holographic optical element situated to couple the ray bundle out of the second image guide at an angle with respect to the second image guide optical axis.

10. The apparatus of claim 1, further comprising an embedded beam coupling prism situated to couple the ray bundle out of the second image guide at an angle with respect to the second image guide optical axis.

11. The apparatus of claim 1, wherein the ray bundle is coupled out of the second image guide so as to superimpose the ray bundle on an image propagating through the second image guide.

12. The apparatus of claim 1, wherein the first and second guides are curved.

13. The apparatus of claim 1, wherein the retro-reflector is a micro retro-reflector array, a micro corner cube array, a roof mirror array, or a cat's eye array.

14. The apparatus of claim 1, wherein the retro-reflector is a curved retro-reflector or a piecewise curved retro-reflector.

15. The apparatus of claim 1, wherein the retro-reflector is a first retro-reflector, and wherein the apparatus further comprises:
a second retro-reflector that is a one-dimensional retro-reflector situated to receive a third ray bundle portion that exits the first image guide output at a third portion angle with respect to the optical axis and reflects at the beam splitter plane and to receive a fourth ray bundle portion that exits the first image guide output at a fourth portion angle opposite the third portion angle with respect to the optical axis and reflects at the beam splitter plane, the second retro-reflector situated to reflect the third and fourth portions along their respective propagation paths incident onto the second retro-reflector.

16. The apparatus of claim 15, wherein the first retro-reflector is a one-dimensional retro-reflector and an axis of reflection associated with the first retro-reflector is perpendicular to an axis of reflection of the second retro-reflector.

17. A heads-up display or head-mounted display comprising the apparatus of claim 1.

18. An apparatus, comprising:
a first image guide having an input, an output, and an optical axis, the first image guide being situated to receive a ray bundle through the input and to propagate the ray bundle so that a first portion of the ray bundle propagating in a tangential plane of the first image guide exits the output at a first portion angle with respect to the first image guide optical axis and a second portion of the ray bundle propagating in the tangential plane exits the output at a second portion angle opposite the first portion angle with respect to the optical axis, a third portion of the ray bundle propagating in a saggital plane of the first image guide exits the output at a third portion angle with respect to the first image guide optical axis and a fourth portion of the ray bundle propagating in the saggital plane exits the output at a fourth portion angle opposite the first portion angle with respect to the optical axis;

a retro-reflector situated to receive the first and second, as well as the third and fourth ray bundle portions and to reflect the respective portions along their respective propagation paths incident onto the retro-reflector;

a beam splitter having a beam splitter plane, the beam splitter being situated to receive the reflected first, second, third, and fourth ray bundle portions from the retro-reflector and to reflect the first, second, third, and fourth ray bundle portions at a beam splitter plane; and a second image guide having an input, output, and optical axis, and situated to receive the first, second, third, and fourth ray bundle portions reflected from the beam splitter plane.

19. A method, comprising:
situating a first image guide having an input, output, and first optical axis so as to receive a ray bundle through the input and so as to propagate the ray bundle so that a first portion of the ray bundle exits the output of the first image guide at a first portion angle with respect to the first optical axis of the first image guide and so that a second portion of the ray bundle exits the output at a second portion angle opposite the first portion angle with respect to the first image guide optical axis;

situating a retro-reflector to receive the first and second ray bundle portions and to reflect the respective portions along their respective propagation paths incident onto the retro-reflector;

situating a beam splitter having a beam splitter plane to receive the reflected first and second ray bundle portions from the retro-reflector and to reflect the first and second ray bundle portions at the beam splitter plane; and situating a second image guide having an input, output, and optical axis to receive the first and second ray bundle portions reflected from the beam splitter plane.

20. The apparatus of claim 1, wherein the retro-reflector includes a plurality of piece-wise portions at selected angles with respect to each other and corresponding to a field of view associated with the ray bundle.

* * * * *